(12) United States Patent
Brown

(10) Patent No.: US 10,023,309 B2
(45) Date of Patent: Jul. 17, 2018

(54) REMOTE CONTROLLED AIRCRAFT

(71) Applicant: James Brown, Athens, AL (US)

(72) Inventor: James Brown, Athens, AL (US)

(*) Notice: Subject to any disclaimer, the term of this patent is extended or adjusted under 35 U.S.C. 154(b) by 134 days.

(21) Appl. No.: 15/130,305

(22) Filed: Apr. 15, 2016

(65) Prior Publication Data

US 2017/0297704 A1    Oct. 19, 2017

(51) Int. Cl.
| | |
|---|---|
| B64C 39/02 | (2006.01) |
| A63H 27/00 | (2006.01) |
| A63H 30/04 | (2006.01) |
| B64C 27/08 | (2006.01) |
| B64D 47/06 | (2006.01) |
| G05D 1/00 | (2006.01) |

(52) U.S. Cl.
CPC ........... *B64C 39/024* (2013.01); *A63H 27/02* (2013.01); *A63H 27/12* (2013.01); *A63H 30/04* (2013.01); *B64C 27/08* (2013.01); *B64D 47/06* (2013.01); *G05D 1/0011* (2013.01); *B64C 2201/024* (2013.01); *B64C 2201/027* (2013.01); *B64C 2201/042* (2013.01); *B64C 2201/108* (2013.01); *B64C 2201/127* (2013.01); *B64C 2201/145* (2013.01); *B64C 2201/146* (2013.01); *B64C 2203/00* (2013.01); *B64D 2203/00* (2013.01)

(58) Field of Classification Search
CPC ........ A63H 27/02; A63H 27/04; A63H 27/12; A63H 27/00; A63H 33/425; B64C 2201/024; B64C 2201/027; B64C 2203/00

See application file for complete search history.

(56) References Cited

U.S. PATENT DOCUMENTS

| | | | | |
|---|---|---|---|---|
| 4,095,784 A | * | 6/1978 | Kennedy | A63H 27/04 |
| | | | | 472/9 |
| 4,160,339 A | | 7/1979 | Dankman | |
| D260,789 S | * | 9/1981 | Probert | 244/158.1 |
| D288,945 S | * | 3/1987 | Rodis-Jamero | D21/451 |
| D307,923 S | | 5/1990 | Probert | |
| 5,383,810 A | * | 1/1995 | Loving | A63H 27/12 |
| | | | | 244/12.2 |

(Continued)

FOREIGN PATENT DOCUMENTS

EP    1901153    9/2006

OTHER PUBLICATIONS

How Spin Master built a USS Enterprise drone that really flies Nicholas Hune-Brown, Apr. 6, 2016, Canadian Business http://www.canadianbusiness.com/innovation/spin-master-designing-uss-enterprise-drone/.*

(Continued)

*Primary Examiner* — Joseph W Sanderson

(57) ABSTRACT

A remote controlled aircraft includes an aircraft that may be flown. A plurality of light emitters is coupled to the aircraft. A plurality of fans is coupled to the aircraft. Each of the fans may move air thereby facilitating each of the fans to urge the aircraft to fly. A control unit is coupled to the aircraft and the control unit is electrically coupled to each of the fans. The control unit includes a global positioning system. Thus, the control unit may identify a position of the aircraft with respect to Earth. A remote control is provided and the remote control may be manipulated. The remote control is in electrical communication with the control unit such that the remote control controls directional flight of the aircraft.

12 Claims, 5 Drawing Sheets

(56) References Cited

U.S. PATENT DOCUMENTS

| | | | |
|---|---|---|---|
| 5,520,565 A * | 5/1996 | Ulysse | A63H 33/18 |
| | | | 244/154 |
| 6,435,932 B1 | 8/2002 | Lynn | |
| 6,592,071 B2 | 7/2003 | Kinkead et al. | |
| 8,182,306 B2 * | 5/2012 | Scarborough | A63H 33/18 |
| | | | 244/12.2 |
| 8,348,714 B2 | 1/2013 | Newton et al. | |
| 8,666,280 B2 | 3/2014 | Mizuno et al. | |
| 8,992,280 B2 | 3/2015 | Tanous | |
| 9,004,973 B2 | 4/2015 | Condon et al. | |
| 9,434,267 B2 * | 9/2016 | Wang | B60L 11/1822 |
| 2009/0305599 A1 * | 12/2009 | Newton | A63H 27/02 |
| | | | 446/61 |
| 2015/0314865 A1 * | 11/2015 | Bermond | B64C 29/0033 |
| | | | 244/17.27 |
| 2016/0039300 A1 * | 2/2016 | Wang | B60L 11/1822 |
| | | | 244/39 |
| 2017/0259183 A1 * | 9/2017 | Matloff | A63H 27/12 |

OTHER PUBLICATIONS

Air Hogs Star Trek U.S.S. Enterprise Spin Master, retrieved Oct. 24, 2017 https://www.spinmaster.com/product_detail.php?pid=p20711.*

* cited by examiner

REMOTE CONTROLLED AIRCRAFT

BACKGROUND OF THE DISCLOSURE

Field of the Disclosure

The disclosure relates to aircraft devices and more particularly pertains to a new aircraft device that may be remotely controlled and flown.

SUMMARY OF THE DISCLOSURE

An embodiment of the disclosure meets the needs presented above by generally comprising an aircraft that may be flown. A plurality of light emitters is coupled to the aircraft. A plurality of fans is coupled to the aircraft. Each of the fans may move air thereby facilitating each of the fans to urge the aircraft to fly. A control unit is coupled to the aircraft and the control unit is electrically coupled to each of the fans. The control unit includes a global positioning system. Thus, the control unit may identify a position of the aircraft with respect to Earth. A remote control is provided and the remote control may be manipulated. The remote control is in electrical communication with the control unit such that the remote control controls directional flight of the aircraft.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
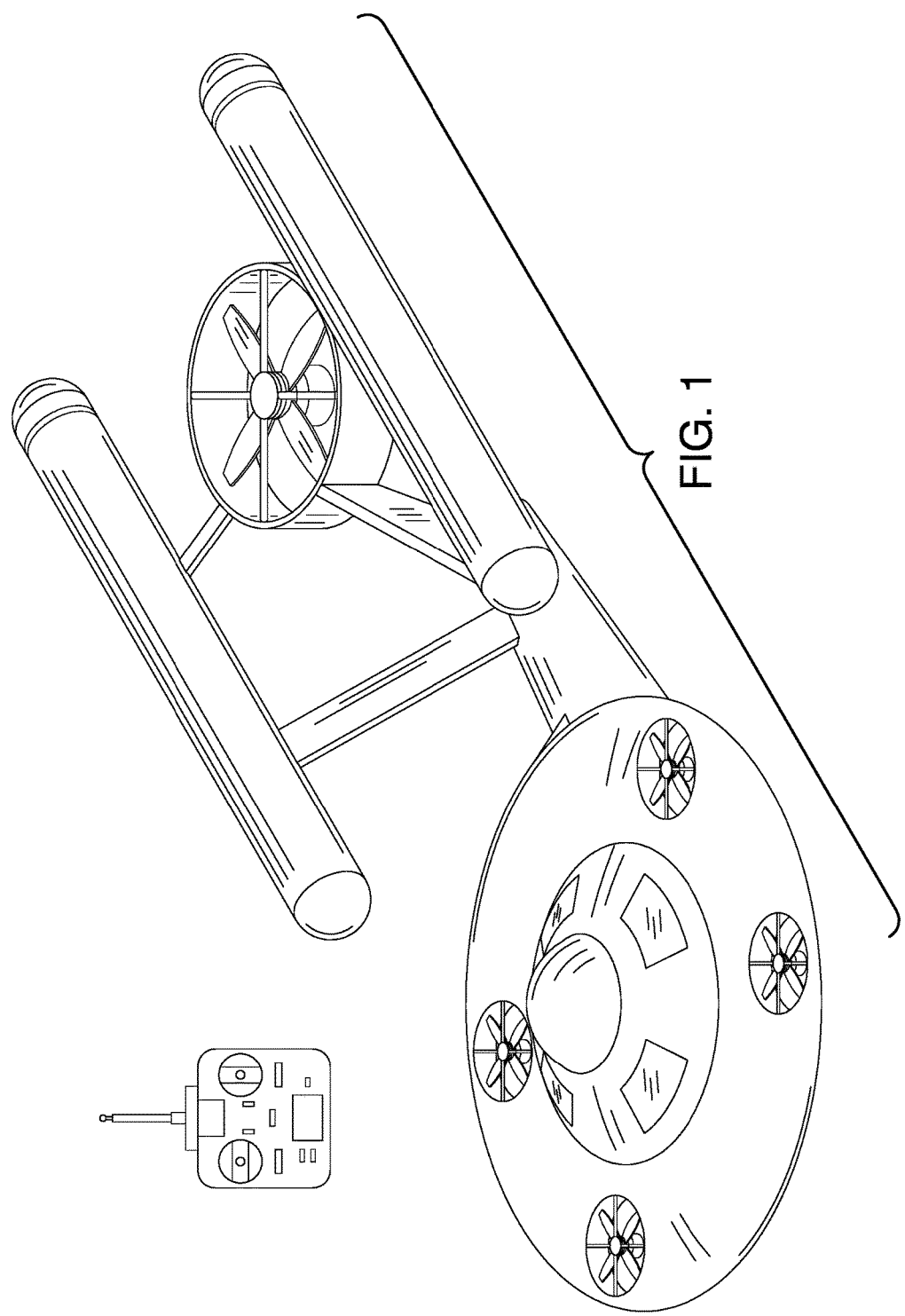
FIG. 1 is a perspective view of a remote controlled aircraft according to an embodiment of the disclosure.
Figure 2:
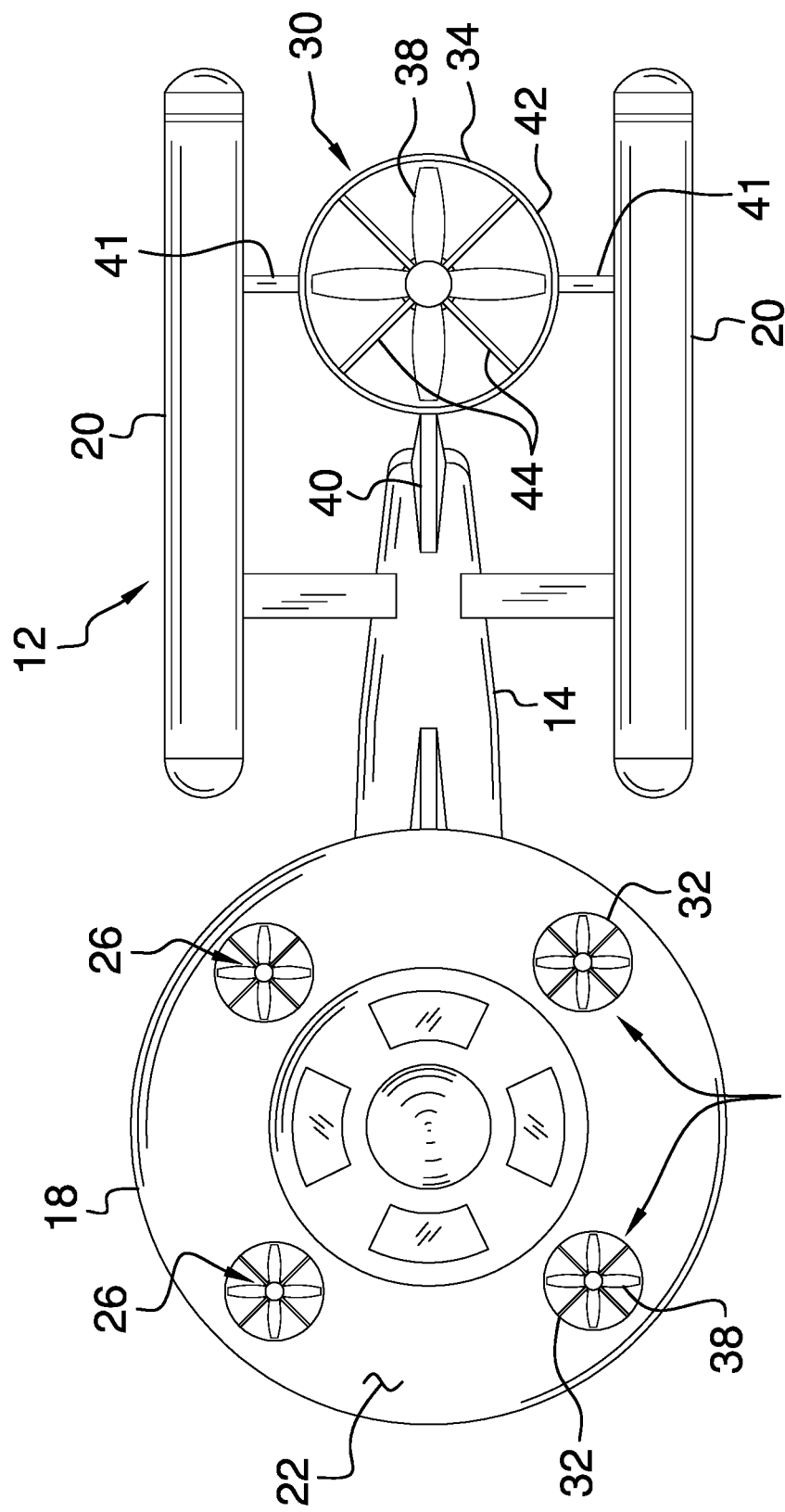
FIG. 2 is a top view of an embodiment of the disclosure.
Figure 3:
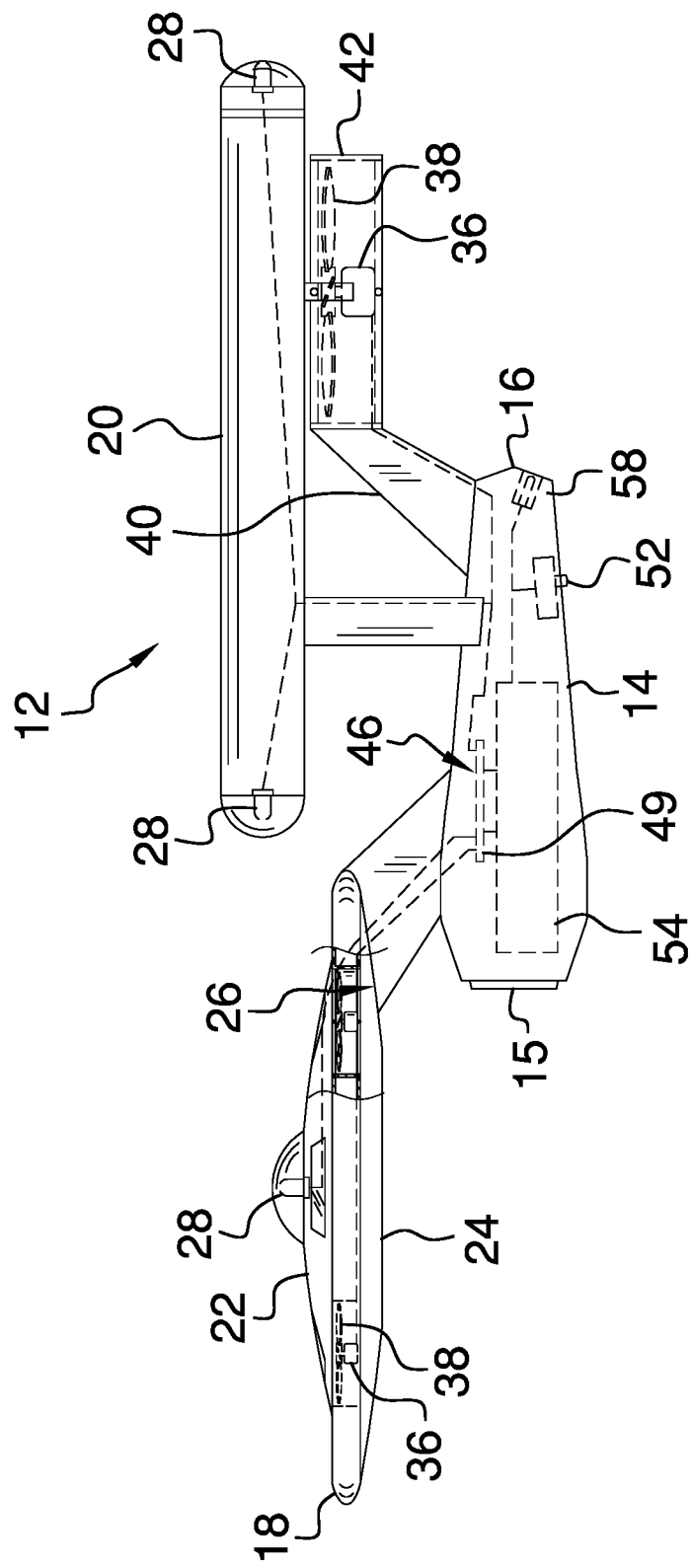
FIG. 3 is a left side view of an embodiment of the disclosure.
Figure 4:
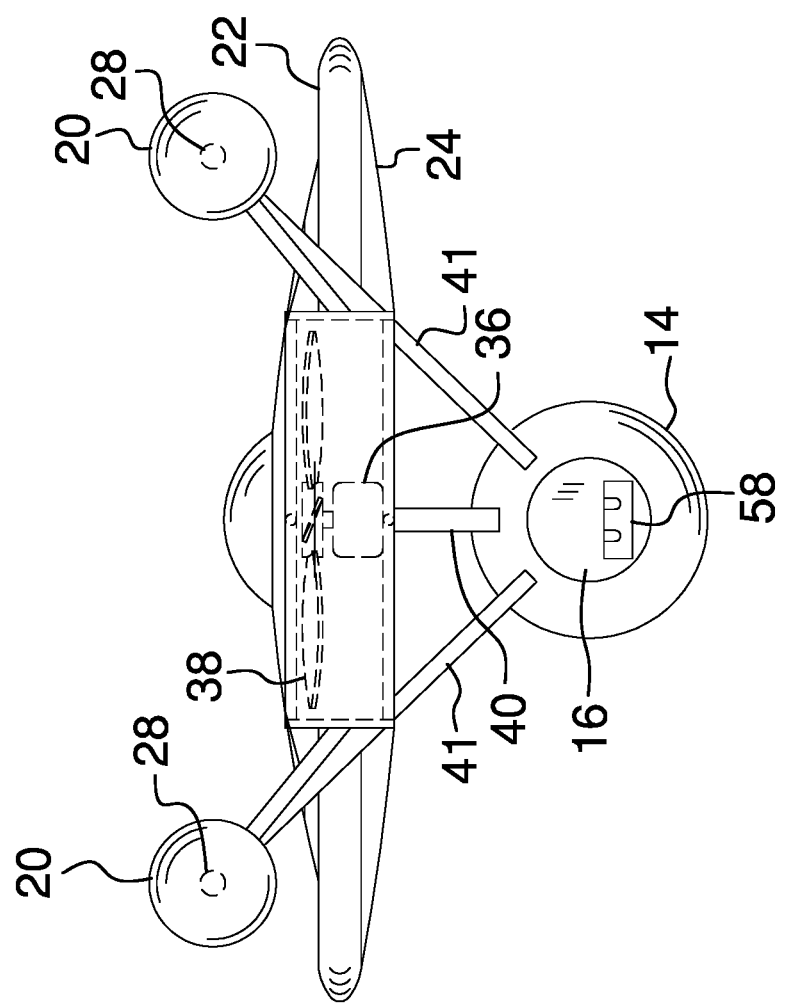
FIG. 4 is a back view of an embodiment of the disclosure.
Figure 5:
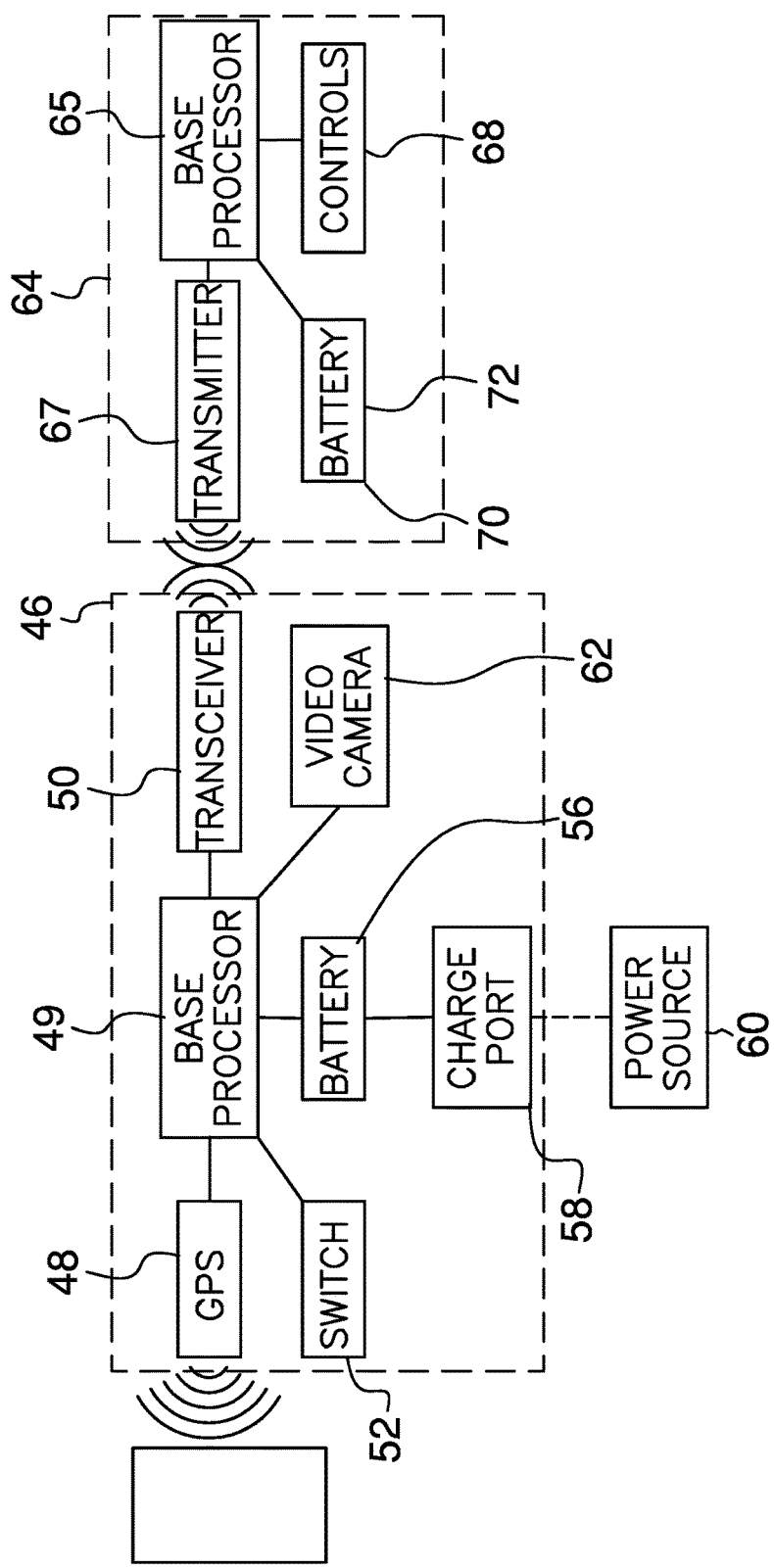
FIG. 5 is a schematic view of an embodiment of the disclosure.

With reference now to the drawings, and in particular to FIGS. 1 through 5 thereof, a new aircraft device embodying the principles and concepts of an embodiment of the disclosure and generally designated by the reference numeral 10 will be described.

As best illustrated in FIGS. 1 through 5, the remote controlled aircraft 10 generally comprises an aircraft 12 that may be flown. The aircraft 12 comprises a fuselage 14 that has a front end 15 and a back end 16. A disk 18 is coupled to and is spaced from the fuselage 14. A pair of tubes 20 is provided and each of the tubes 20 is coupled to and is spaced from the fuselage 14. The aircraft 12 may have an ornamental appearance of a spacecraft. The spacecraft may be modeled after the USS Enterprise as depicted in the television series "Star Trek".

Each of the tubes 20 is oriented to be coextensive with the fuselage 14. The tubes 20 are spaced apart from each other. Each of the tubes 20 is positioned closer to the back end 16 than the front end 15. The disk 18 is positioned adjacent to the front end 15 and the disk 18 has a top surface 22 and a bottom surface 24. The disk 18 has a plurality of apertures 26 each extending through the top surface 22 and the bottom surface 24. The apertures 26 are spaced apart from each other and are distributed around the disk 18. The disk 18 is horizontally oriented.

A plurality of light emitters 28 is provided. Each of the light emitters 28 is coupled to the aircraft 12. Thus, each of the light emitters 28 may emit light outwardly from the aircraft 12. Each of the light emitters 28 may comprise an LED or the like. The light emitters 28 may be distributed around the disk 18 and on opposite ends of the each of the tubes 20.

A plurality of fans 30 is provided and each of the fans 30 is coupled to the aircraft 12. Each of the fans 30 may move air thereby facilitating each of the fans 30 to urge the aircraft 12 to fly. The plurality of fans 30 comprises a set of first fans 32 and a second fan 34. Each of the first fans 32 is positioned in an associated one of the apertures 26 in the disk 18. The second fan 34 is coupled to the tubes 30 and the second fan 34 is centrally positioned between the tubes 20.

Each of the fans 32 comprises a motor 36 that is coupled to the aircraft 12. The motor 36 corresponding to each of the fans 32 may comprise an electric motor or the like. A propeller 38 is coupled to the motor 36 corresponding to each of the fans 32. Thus, the motor 36 rotates the propeller 38 when the motor 36 is turned on. Each of the fans 32 may comprise a flying drone motor or the like.

The second fan 34 comprises a first support 40. The first support 34 is coupled to and extends upwardly from the fuselage 14. The first support 34 is positioned adjacent to the back end 16 of the fuselage 14. The first support 34 has a distal end 36 with respect to the fuselage 14.

A pair of second supports 41 is provided. Each of the second supports 41 is coupled to an associated one of the tubes 30. The second supports 41 are directed toward each other. Each of the second supports 41 has a distal end 40 with respect to the associated tube 30.

A ring 42 is provided. The ring 42 is coupled to the distal end 36 corresponding to the first support 34 and the distal end 40 corresponding to the second supports 41. The motor 36 corresponding to the second fan 34 is coupled to and is centrally positioned in the ring 42. The ring 42 is horizontally oriented on the aircraft 12. A plurality of braces 44 may extend between the ring 42 and the motor 36 corresponding to the second fan 34. The braces 44 may be spaced apart from each other and may be distributed around the ring 42.

A control unit 46 is coupled to the aircraft 12. The control unit 46 is electrically coupled to each of the fans 30 and the control unit 46 controls operational parameters of the fans 30. The control unit 46 includes a global positioning system (gps) 48. The gps 48 identifies a position of the aircraft 12 with respect to Earth. The control unit 46 may comprise an electronic control for a remotely controlled drone or the like.

The control unit 46 comprises a base processor 49 that is coupled to the aircraft 12. The motor 36 corresponding to each of the fans 30 is electrically coupled to the base processor 49. The base processor 49 may comprise a remotely controlled aircraft processor or the like. Each of the light emitters 28 is electrically coupled to the base processor 49. The gps 48 is electrically coupled to the base processor 49. The gps 48 may be in electrical communication with a global positioning satellite or the like. Thus, the gps 48 establishes the position of the aircraft 12 with respect to Earth.

A transceiver 50 is coupled to the aircraft 12 and the transceiver 50 is electrically coupled to the base processor 49. The transceiver 50 may comprise a radio frequency transceiver or the like. A switch 52 is coupled to the aircraft 12 and the switch 52 may be manipulated. The switch 52 is electrically coupled to the base processor 49. Thus, the switch 52 turns the base processor 49 on and off.

A base power supply 54 is coupled to the aircraft 12 and the base power supply 54 is electrically coupled to the base processor 49. The base power supply 54 comprises at least one battery 56 that is positioned within the aircraft 12. A charge port 58 is coupled to the aircraft 12 and the charge port 58 is electrically coupled to the at least one battery 56. The charge port 58 may be electrically coupled to a power source 60. Thus, the charge port 58 may charge the at least one battery 56. The power source 60 may comprise a battery charger or the like.

A video camera 62 is provided and the video camera 62 is coupled to the aircraft 12. The video camera 62 may be positioned on the disk 18. Thus, the video camera 62 may record video footage when the aircraft 12 is flown. The video camera 62 is electrically coupled to the base processor 49.

The transceiver 50 may be in communication with an extrinsic electronic device. Thus, the transceiver 50 may communicate the video footage to the extrinsic electronic device. The transceiver 50 may communicate the gps location of the aircraft 12 to the extrinsic electronic device. Thus, the aircraft 12 may be located when the aircraft 12 is lost. The extrinsic electronic device may comprise a smart phone or a personal computer.

A remote control 64 is provided. The remote control 64 may be manipulated when the aircraft 12 is flown. The remote control 64 is in electrical communication with the control unit 46. Thus, the remote control 64 controls directional flight of the aircraft 12.

The remote control 64 comprises a housing 66 that may be manipulated. A remote processor 65 is positioned within the housing 66. The remote processor 65 may comprise a remotely controlled aircraft processor or the like. A transmitter 67 is positioned within the housing 66 and the transmitter 67 is electrically coupled to the remote processor 65. The transmitter 67 is in electrical communication with the transceiver 50. The transmitter 67 may comprise a radio frequency transmitter or the like.

A plurality of controls 68 is provided. Each of the controls 68 is movably coupled to the housing 66 and each of the controls 68 may be manipulated. Each of the controls 68 may control directional flight commands with respect to the aircraft 12. Each of the controls 68 is electrically coupled to the remote processor 65. Thus, the transmitter 67 communicates the directional flight commands to the transceiver 50. Each of the controls 68 may comprise remotely controlled aircraft controls or the like.

A remote power supply 70 is provided. The remote power supply 70 is positioned within the housing 66. The remote power supply 70 is electrically coupled to the remote processor 65. The remote power supply 70 comprises at least one battery 72.

In use, each of the aircraft 12 and the remote control 64 are taken outdoors. The controls 68 on the remote control 64 are manipulated to fly the aircraft 12. The fans 30 operate in tandem to urge the aircraft 12 through the air in the convention of remotely controlled drones. The video camera 62 records video footage as the aircraft 12 is flown. The video footage is viewed on the extrinsic electronic device. The gps location of the aircraft 12 is viewed on the extrinsic electronic device when the aircraft 12 is lost. Thus, the aircraft 12 is retrieved when the aircraft 12 is lost.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remote controlled aircraft assembly comprising:
   an aircraft being configured to be flown, wherein said aircraft comprises
   a fuselage having a front end and a back end;
   a disk being coupled to and being spaced from said fuselage, said disk being positioned adjacent to said front end, said disk having a top surface and a bottom surface, said disk having a plurality of apertures, each of said apertures extending through said top surface and said bottom surface, said apertures being spaced apart from each other and being distributed around said disk, said disk being horizontally oriented, and
   a pair of tubes, each of said tubes being coupled to and being spaced from said fuselage, each of said tubes being oriented to be coextensive with said fuselage, said tubes being spaced apart from each other, each of said tubes being positioned closer to said back end than said front end;
   a plurality of light emitters, each of said light emitters being coupled to said aircraft wherein each of said light emitters is configured to emit light outwardly from said aircraft;
   a plurality of fans, each of said fans being coupled to said aircraft wherein each of said fans is configured to move air thereby facilitating each of said fans to urge said aircraft to fly, said plurality of fans including a set of first fans and a second fan, each of said first fans being positioned in an associated one of said apertures in said disk, said second fan being coupled to said tubes, said second fan being centrally positioned between said tubes, wherein said second fan comprises a first support being coupled to and extending upwardly from said fuselage, said first support being positioned adjacent to said back end, said first support having a distal end with respect to said fuselage;

a pair of second supports, each of said second supports being coupled to an associated one of said tubes, said second supports being directed toward each other, each of said second supports having a distal end with respect to said associated tube;

a ring being coupled to said distal end corresponding to said first support and said distal end corresponding to said second supports, a motor corresponding to said second fan being coupled to and being centrally positioned in said ring, said ring being horizontally oriented;

a control unit being coupled to said aircraft, said control unit being electrically coupled to each of said fans such that said control unit controls operational parameters of said fans, said control unit including a global positioning system wherein said control unit is configured to identify a position of said aircraft with respect to Earth; and a remote control being configured to be manipulated, said remote control being in electrical communication with said control unit such that said remote control controls directional flight of said aircraft.

2. The assembly according to claim 1, wherein each of said fans comprises:
a motor being coupled to said aircraft; and
a propeller being coupled to said motor such that said motor rotates said propeller when said motor is turned on.

3. The assembly according to claim 1, wherein:
each of said fans includes a motor; and
said control unit comprises a base processor being coupled to said aircraft, said motor corresponding to each of said fans being electrically coupled to said base processor, each of said light emitters being electrically coupled to said base processor.

4. The assembly according to claim 3, wherein said global positioning system is electrically coupled to said base processor, said global positioning system being configured to be in electrical communication with a global positioning satellite.

5. The assembly according to claim 4, further comprising a transceiver being coupled to said aircraft, said transceiver being electrically coupled to said base processor.

6. The assembly according to claim 3, further comprising a switch being coupled to said aircraft wherein said switch is configured to be manipulated, said switch being electrically coupled to said base processor such that said switch turns said base processor on and off.

7. The assembly according to claim 3, further comprising a base power supply being coupled to said aircraft, said base power supply being electrically coupled to said base processor.

8. The assembly according to claim 7, wherein said base power supply comprises:
at least one battery being positioned within said aircraft; and
a charge port being coupled to said aircraft, said charge port being electrically coupled to said at least one battery, said charge port being configured to be electrically coupled to a power source thereby facilitating said charge port to charge said at least one battery.

9. The assembly according to claim 1, wherein:
said control unit includes a transceiver; and
said remote control comprises:
a housing being configured to be manipulated,
a remote processor being positioned within said housing, and
a transmitter being positioned within said housing, said transmitter being electrically coupled to said remote processor, said transmitter being in electrical communication with said transceiver.

10. The assembly according to claim 9, further comprising a plurality of controls, each of said controls being movably coupled to said housing wherein each of said controls is configured to be manipulated, each of said controls controlling directional flight commands with respect to said aircraft, each of said controls being electrically coupled to said remote processor such that said transmitter communicates said directional flight commands to said transceiver.

11. The assembly according to claim 9, further comprising a remote power supply being positioned within said housing, said remote power supply being electrically coupled to said remote processor, said remote power supply comprising at least one battery.

12. A remote controlled aircraft assembly comprising:
an aircraft being configured to be flown, said aircraft comprising:
a fuselage having a front end and a back end,
a disk being coupled to and being spaced from said fuselage, said disk being positioned adjacent to said front end, said disk having a top surface and a bottom surface, said disk having a plurality of apertures, each of said apertures extending through said top surface and said bottom surface, said apertures being spaced apart from each other and being distributed around said disk, said disk being horizontally oriented; and
a pair of tubes, each of said tubes being coupled to and being spaced from said fuselage, each of said tubes being oriented to be coextensive with said fuselage, said tubes being spaced apart from each other, each of said tubes being positioned closer to said back end than said front end;
a plurality of light emitters, each of said light emitters being coupled to said aircraft wherein each of said light emitters is configured to emit light outwardly from said aircraft;
a plurality of fans, each of said fans being coupled to said aircraft wherein each of said fans is configured to move air thereby facilitating each of said fans to urge said aircraft to fly, said plurality of fans comprising a set of first fans and a second fan, each of said first fans being positioned in an associated one of said apertures in said disk, said second fan being coupled to said tubes, said second fan being centrally positioned between said tubes, each of said fans comprising:
a motor being coupled to said aircraft, and
a propeller being coupled to said motor such that said motor rotates said propeller when said motor is turned on;
said second fan comprising:
a first support being coupled to and extending upwardly from said fuselage, said first support being positioned adjacent to said back end, said first support having a distal end with respect to said fuselage,
a pair of second supports, each of said second supports being coupled to an associated one of said tubes, said second supports being directed toward each other, each of said second supports having a distal end with respect to said associated tube, and
a ring being coupled to said distal end corresponding to said first support and said distal end corresponding to said second supports, said motor corresponding to said second fan being coupled to and being centrally positioned in said ring, said ring being horizontally oriented;

a control unit being coupled to said aircraft, said control unit being electrically coupled to each of said fans such that said control unit controls operational parameters of said fans, said control unit including a global positioning system wherein said control unit is configured to identify a position of said aircraft with respect to Earth, said control unit comprising:
  a base processor being coupled to said aircraft, said motor corresponding to each of said fans being electrically coupled to said base processor, each of said light emitters being electrically coupled to said base processor,
  said global positioning system being electrically coupled to said base processor, said global positioning system being configured to be in electrical communication with a global positioning satellite;
  a transceiver being coupled to said aircraft, said transceiver being electrically coupled to said base processor,
  a switch being coupled to said aircraft wherein said switch is configured to be manipulated, said switch being electrically coupled to said base processor such that said switch turns said base processor on and off, and
  a base power supply being coupled to said aircraft, said base power supply being electrically coupled to said base processor, said base power supply comprising:
    at least one battery being positioned within said aircraft, and
    a charge port being coupled to said aircraft, said charge port being electrically coupled to said at least one battery, said charge port being configured to be electrically coupled to a power source thereby facilitating said charge port to charge said at least one battery; and a remote control being configured to be manipulated, said remote control being in electrical communication with said control unit such that said remote control controls directional flight of said aircraft, said remote control comprising:
  a housing being configured to be manipulated,
  a remote processor being positioned within said housing,
  a transmitter being positioned within said housing, said transmitter being electrically coupled to said remote processor, said transmitter being in electrical communication with said transceiver,
  a plurality of controls, each of said controls being movably coupled to said housing wherein each of said controls is configured to be manipulated, each of said controls controlling directional flight commands with respect to said aircraft, each of said controls being electrically coupled to said remote processor such that said transmitter communicates said directional flight commands to said transceiver, and
  a remote power supply being positioned within said housing, said remote power supply being electrically coupled to said remote processor, said remote power supply comprising at least one battery.

* * * * *